(12) United States Patent
Guigan

(10) Patent No.: US 9,058,535 B2
(45) Date of Patent: Jun. 16, 2015

(54) SECURITY BARCODE

(76) Inventor: Franck Guigan, Paris (FR)

( * ) Notice: Subject to any disclaimer, the term of this patent is extended or adjusted under 35 U.S.C. 154(b) by 0 days.

(21) Appl. No.: 14/110,061

(22) PCT Filed: Mar. 19, 2012

(86) PCT No.: PCT/FR2012/000096
§ 371 (c)(1),
(2), (4) Date: Apr. 23, 2014

(87) PCT Pub. No.: WO2012/136902
PCT Pub. Date: Oct. 11, 2012

(65) Prior Publication Data
US 2014/0224879 A1    Aug. 14, 2014

(30) Foreign Application Priority Data

| Apr. 5, 2011 | (FR) | 11 01010 |
| Apr. 6, 2011 | (FR) | 11 01027 |
| Apr. 13, 2011 | (FR) | 11 01124 |
| Apr. 21, 2011 | (FR) | 11 01244 |
| Apr. 21, 2011 | (FR) | 11 01245 |
| Jun. 7, 2011 | (FR) | 11 01726 |
| Jun. 21, 2011 | (FR) | 11 01900 |
| Jun. 28, 2011 | (FR) | 11 01986 |
| Jun. 29, 2011 | (FR) | 11 02012 |
| Sep. 1, 2011 | (FR) | 11 02649 |
| Jan. 31, 2012 | (FR) | 12 00276 |

(51) Int. Cl.
*G06K 7/10* (2006.01)
*G06K 7/14* (2006.01)
(Continued)

(52) U.S. Cl.
CPC ............ *G06K 7/1456* (2013.01); *G07D 7/0006* (2013.01); *G07D 7/124* (2013.01);
(Continued)

(58) Field of Classification Search
CPC .................. G06K 19/06037; G06K 19/06056; G06K 7/1417; G06K 7/1456; G07D 6/006; G07D 7/124; G07D 7/2025
USPC .................... 235/454, 462.06, 462.09, 462.1, 235/462.15, 494
See application file for complete search history.

(56) References Cited

U.S. PATENT DOCUMENTS 4,417,784 A    11/1983    Knop et al.
5,543,965 A    8/1996    Bielinski et al.
(Continued)

FOREIGN PATENT DOCUMENTS

EP    1143372 B1    3/2006
EP    2166486 A2    3/2010
(Continued)

*Primary Examiner* — Seung Lee
(74) *Attorney, Agent, or Firm* — The Webb Law Firm

(57) ABSTRACT

A security barcode is made up of modules that include optical disrupters that are too small to be deliberately placed in precise positions. The barcode is authenticated by a simple webcam including three-dimensional positioning means co-operating with a recognizable graphic structure referred to as a "marker". In order to establish the authenticity of an article protected by the code, a description of the code is made after the code has been printed and is stored in a database, and that description is compared with a new description that results from at least two acquisitions, one made under the same conditions, and the other made while changing the three-dimensionally defined viewpoint and/or the lighting. In its preferred variant, the barcode cannot be printed in order to represent a predetermined number. It is also impossible to reproduce the barcode.

21 Claims, 3 Drawing Sheets

(51) Int. Cl.
*G07D 7/00* (2006.01)
*G07D 7/12* (2006.01)
*G07D 7/20* (2006.01)
*G06K 19/06* (2006.01)
*G06K 19/08* (2006.01)

(52) U.S. Cl.
CPC ........... *G07D 7/2025* (2013.01); *G06K 7/1417* (2013.01); *G06K 19/06037* (2013.01); *G06K 19/06056* (2013.01); *G06K 19/083* (2013.01)

(56) References Cited

U.S. PATENT DOCUMENTS

| | | | |
|---|---|---|---|
| 6,833,960 B1 | 12/2004 | Scarbrough et al. | |
| 6,856,462 B1 | 2/2005 | Scarbrough et al. | |
| 7,032,823 B2 * | 4/2006 | Nojiri | 235/462.09 |
| 7,609,451 B1 | 10/2009 | Scarbrough | |
| 8,066,195 B2 * | 11/2011 | Takano et al. | 235/494 |
| 8,322,620 B2 * | 12/2012 | Ye et al. | 235/462.09 |
| 2004/0112962 A1 | 6/2004 | Farrall et al. | |
| 2007/0246932 A1 | 10/2007 | Heine et al. | |
| 2009/0008924 A1 | 1/2009 | Ophey et al. | |
| 2010/0200649 A1 | 8/2010 | Callegari et al. | |
| 2010/0277805 A1 | 11/2010 | Schilling et al. | |
| 2014/0055824 A1 | 2/2014 | Tremolada et al. | |

FOREIGN PATENT DOCUMENTS

| | | |
|---|---|---|
| GB | 2304077 A | 3/1997 |
| WO | 9426057 A1 | 11/1994 |
| WO | 9845826 A1 | 10/1998 |
| WO | 0157831 A1 | 8/2001 |
| WO | 2004054444 A1 | 7/2004 |
| WO | 2005052650 A2 | 6/2005 |
| WO | 2009147353 A2 | 12/2009 |
| WO | 2010042999 A1 | 4/2010 |
| WO | 2010057831 A1 | 5/2010 |
| WO | 2011151536 A1 | 12/2011 |
| WO | 2012131239 A1 | 10/2012 |

* cited by examiner

SECURITY BARCODE

CROSS-REFERENCE TO RELATED APPLICATIONS

This application is the United States national phase of International Application No. PCT/FR2012/000096 filed Mar. 19, 2012, and claims priority to French Patent Application Nos. 11/01010 filed Apr. 5, 2011; 11/01027 filed Apr. 6, 2011; 11/01124 filed Apr. 13, 2011; 11/01244 and 11/01245, both filed Apr. 21, 2011; 11/01726 filed Jun. 7, 2011; 11/01900 filed Jun. 21, 2011; 11/01986 filed Jun. 28, 2011; 11/02012 filed Jun. 29, 2011; 11/02649 filed Sep. 1, 2011; and 12/00276 filed Jan. 31, 2012, the disclosures of which are hereby incorporated in their entirety by reference.

TECHNICAL FIELD

The present invention is an authentication method that makes it possible to verify the authenticity of goods such as for example a printed document, by comparing the characteristics of an authentication device—a barcode—with the recording that has previously been made thereof. The invention also makes secure authentication possible for cards that are themselves impossible to reproduce, for which it is necessary to have the original available in order to perform transactions of all kinds (e.g. payment).

PROBLEM POSED

All kinds of goods and documents can suffer counterfeiting, with this going from payment instruments to industrial goods, and including official documents and pharmaceuticals. According to the World Health Organization (WHO), counterfeit pharmaceuticals represent 6% to 10% of the turnover of the worldwide pharmaceutical industry and lead to major public health risks throughout the world.

According to the WHO Nov. 2, 2006 press release announcing the launch of the first international medical products anti-counterfeiting task force (IMPACT), "Counterfeit medicines are dangerous products. They promote drug-resistant strains of disease and can worsen medical conditions or cause death. They are present on all markets and are increasing as counterfeiters' methods become more sophisticated, infiltrating official channels of distribution as well as using illegal web sites to sell their wares". That phenomenon has continued to develop very greatly since that press release.

This problem is particularly troublesome in that it has remained without a solution for many years and it is getting worse. The solutions proposed are all too expensive to be applied to consumer goods—including pharmaceuticals in general circulation—and to all printed documents.

The difficulty lies in enabling a verifier, who may merely be an individual, to compare an authentication device that is difficult or impossible to reproduce with a recording that has been made of the device in question before it was put into circulation. This needs to be done without using special equipment and must be very easy to do.

There exists a second unsolved problem that is of importance: in the prior art, the methods of authenticating personal cards rely on codes and it is impossible for anyone to know whether those codes have been appropriated in one way or another by a third party, and no means have been proposed that make it essential to have the original of the card to hand, the card including a code for identifying a person on the Internet or for making a payment.

PRIOR ART

The making of security devices has relied for a long time on a principle that consists in using complex technologies that are difficult for counterfeiters to reproduce. The profitability of the activities of counterfeiters, and in particular of currency counterfeiters is nevertheless such that they always manage to counterfeit such devices. Three examples may be mentioned:

WO 2010/042999 A1 (Securency Internat Pty Ltd 2010 Apr. 22), which describes a security device that is difficult to reproduce and that includes a lens array serving to obtain "moire magnification" of "moving or floating images" or other "interesting optical effects";

EP 2 166 486 A2 (Lumos Technology Co Ltd 2010 Mar. 24), which describes a portable image extractor device (70) for identifying tiny images with the help of a magnifying lens; and US 2007/246932 (Heine Astrid et al. 2007 Oct. 25), which describes a data medium with an optically variable structure such that certain portions of the device are visible only under one or more predetermined viewing angles.

The most appropriate state of the art for achieving the object sought by the invention is represented by an older document: patent GB 2304077A (Farrall 1997 Mar. 12), which gave rise to patent US 2004/112962 A1 (2004 Jun. 17) and which describes a device having reflective particles that are randomly distributed. Its author explains that it is possible to compare a description of those particles with a description that is included in a database, however the scanner means proposed are very complex and specific.

The principle that consists in comparing the characteristics of an authentication device with the recording that has been made of that device in a database was thus devised by Farrall as from Jun. 30, 1995, the date on which patent application GB 2304077A was filed. The principle of a device including particles that are randomly distributed, and even reflective particles, is also old since it is described in that document.

Nevertheless, since that date, and in spite of the gravity of the problem that is to be solved, and in spite of intense inventive activity, and large amounts of investment by numerous and powerful companies that are specialized in the technical field—as can be seen from the large number of patent applications that have been filed in this technical field—the problem still remains unresolved and counterfeiting is progressing.

None of the more recent documents representative of the state of the art presents a solution that genuinely answers the problem.

WO 98/45826 (Slater and Hardman 1998 Oct. 15), describes an identification label constituted by a solidified plastics matrix having a plurality of beads therein that can be distinguished by eye and that are arranged randomly.

WO 01/57831 (Bourrières and Kaiser 2001 Aug. 9), describes a method of reading means for identifying a unique and non-reproducible volume comprising a mixture of at least two mutually distinguishable materials, and remarkable in that it consists firstly in recognizing the heterogeneous internal structure in two dimensions of said identification means and secondly in revealing and testing its third dimension, thereby making any decoy impossible. But according to the inventors themselves: "The identification and authentication of the identifier is done with the aid of a specific reader which allows the submission of the identifier to two different illuminations and of comparing the signature of the identifier presented with the one registered in the database. The necessity to use a specific reader is also a major obstacle in the extension of this technology in particular for applications to the general public".

WO 2004/054444 A1 (Bourrières and Kaiser 2004 Jul. 1), describes an indirect method of identification and authentication without using an article reader, with the help of a three-dimensional identifier attached to said article, the identifier presenting non-uniformities that are randomly distributed inside a transparent material thus making the material difficult or impossible to reproduce. That method has the announced advantage of not requiring a reader, but it relies entirely on human vision and is therefore not reliable.

US 2009/008924 A1 (Ophey Willem Gérard et al.—2009 Jan. 8) describes a method of authenticating a device having physically-detectable particles embedded in a substrate. That method includes a digital representation of the physical properties of the particles and of their distribution, but it does not propose any means for ensuring that the security device has not been replaced by a photograph of an existing device.

US 2010/200649 A1 (Callegari Andrea et al.—2010 Aug. 12), describes a marking method relying on a random distribution of particles having the property of reflecting circularly polarized light, in association with corresponding authentication equipment. That makes it easy to distinguish the marking from its medium even when the medium is colored and/or reflective. Its drawback is that it requires the use of two light sources that are polarized in different ways, together with particles that reflect circularly polarized light in a special way.

The explanation for the failure of the prior art is simple:

1) All prior art methods suffer from one and/or more of the following three drawbacks:
   the authentication devices used can be fabricated only by making use of means that are rare and expensive, and as a result they are too expensive to be applied to consumer goods and to everyday documents;
   or else they are large in size, and therefore difficult to incorporate in goods or a document;
   or indeed no method is proposed for reading them other than using a microscope or some other specially designed and expensive accessory device.

2) No one has proposed a flawless and inexpensive method that satisfies the need of professionals and of the general public to verify the authenticity of goods or of a document using ordinary equipment such as a mobile telephone.

3) Nor has anybody proposed a procedure for authenticating people that makes it essential to have available the original of a card, regardless of whether people are face to face or communicating over the Internet, and in spite of the fact that identity theft is one of the main sources of fraud, in particular on the Internet.

SUMMARY OF THE INVENTION

The present invention provides an authentication method consisting in establishing a "subsequent" description of an authentication device 1 that comprises a "coded" entity 11, itself comprising light-disrupting elements referred to as "disrupters" 111, 112, et seq., and in comparing this description with an "original" description of said authentication device 1, the method being characterized by the facts:
that said disrupters 111, 112, et seq. are grouped together in sub-entities 1A, 1B, et seq. referred to as "modules", a module returning light in perceptibly different ways depending on the point of view from which it is observed;

that a description includes an operation referred to below as "acquisition" that consists in using acquisition means 3 for measuring the brightness of a plurality of said modules 1A, 1B, et seq., at one or more wavelengths or sets of wavelengths;

that said original description is established from an acquisition made from an "original" viewpoint defined relative to said authentication device 1; and that the procedure enabling said subsequent description to be established and enabling said comparison to be made comprises:
using positioning means that co-operate with a recognizable graphics structure referred to as a "marker" 2 to determine the three-dimensional position in which said acquisition means 3 are located relative to said authentication device 1;
taking an acquisition while said acquisition means 3 are placed close to the original viewpoint; and
taking at least one "additional" acquisition:
either from a viewpoint that is perceptibly different from said original viewpoint;
or else under lighting that is different from that used for the acquisition that was used for establishing said original description.

BRIEF DESCRIPTION OF THE DRAWINGS

The invention can be well understood and other objects, advantages, and characteristics thereof appear more clearly on reading the following description, which is illustrated by FIGS. 1 to 14.

Figure 8:
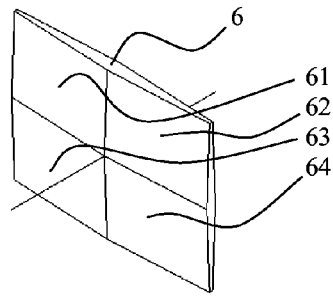

FIG. 8 shows an optical device referred to as an "image multiplier" 6 that provides a plurality of images of said authentication device 1. It is constituted by four plane prisms 61, 62, 63, and 64.

Figure 9:
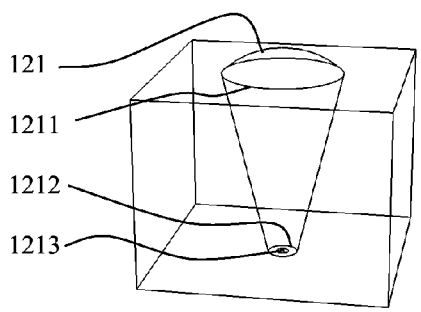

FIG. 9 shows a lens 121 having its iris defined by a circle 1211. This lens focuses on a surface 1212 referred to as a "focus surface", including a zone 1213 referred to as a "significant zone".

Figure 10:
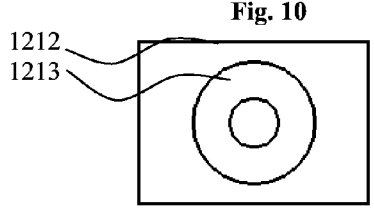
Figure 11:
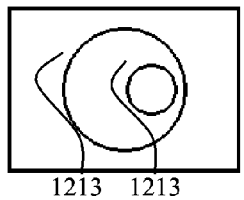
Figure 12:
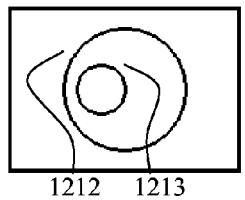

FIGS. 10 to 12 show how the position of said focus surface 1212 varies relative to said significant zone 1213 as a result of said acquisition means 3 moving relative to said authentication device 1.

Figure 13:
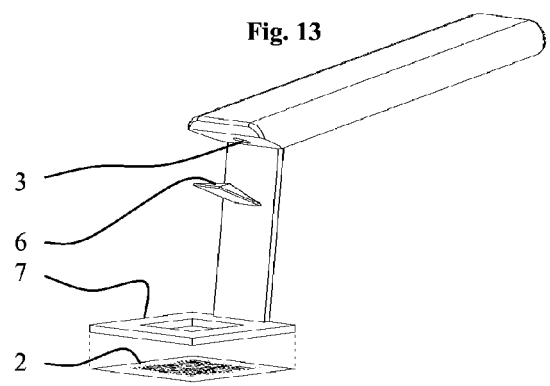

FIG. 13 shows a device of the invention comprising a marker 2 and acquisition means 3 comprising an image multiplier 6 and positioning means 7 that need to be caused to coincide with said square marker 2 in order to place said acquisition means 3 at said original viewpoint.

Figure 14:
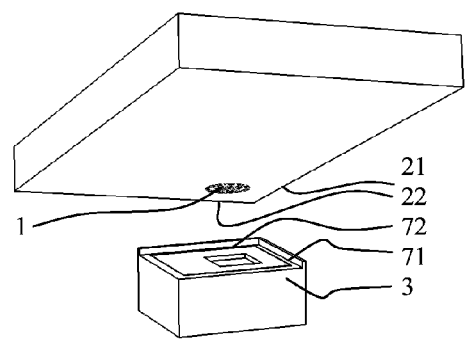

FIG. 14 shows a device 1 of the invention comprising a marker 2 made up of two edges projecting from the goods provided with said authentication device 1, and acquisition means 3 comprising positioning means made up of two re-entrant angles 71 and 72 that need to be made to coincide with the projecting edges 21 and 22 forming said marker 2 in order to cause said acquisition means 3 to be placed at said original viewpoint relative to said device 1.

DETAILED DESCRIPTION OF THE INVENTION

The Principle

The principle of the present invention consists in authenticating an authentication device 1 by comparing a description of the device 1, which description is referred to as a "subsequent" description, with a description of the same device 1, which description is referred to as an "original" description. Each of the characteristics of the method operates in synergistic manner with the others in order to obtain authentication that is reliable.

Said disrupters being grouped together in sub-entities 1A, 1B, et seq. referred to as "modules" that reflect light in perceptibly different ways depending on the viewpoint from which they are observed gives the device all of the advantages of barcodes: its description may be limited to describing each of the modules 1A, 1B, et seq. in binary form (a module is written 1 when it is pale and 0 when it is dark) or with only a few digits representing its brightness and/or its color.

Determining the three-dimensional position in which said acquisition means 3 are located relative to said marker 2 of the authentication device 1 makes it possible to place said acquisition means 3 at said original viewpoint, or failing that at a location that is close enough thereto to be able to verify that at least a large portion of the device provides an appearance that is substantially identical to that described in said original description of said authentication device 1. In this respect, it is important to observe that the accuracy required for this positioning depends on the nature of the disrupters 111, 112, et seq., and on the nature of the modules 1A, 1B, et seq., and that various methods are described below to make it possible for this positioning to be carried out with lower accuracy.

Successively acquiring two images from two different locations makes it possible to verify the nature of the authentication device 1:

modifying the position of the acquisition means 3 and the position of the lighting makes it possible to verify that such modification does indeed lead to a modification in the image that is received and thus in the description, thereby proving that the device has not been replaced by an imitation, e.g. a photographic imitation; and modifying the lighting also makes it possible to neutralize the effect of ambient lighting, and/or to verify the light-reflection properties of the disrupters of or any other portion of the device.

Advantageously, the disrupters are small enough to ensure that a device of the invention cannot be reproduced by a counterfeiter without that requiring each reproduction to be very costly (or indeed to be completely impossible with known fabrication means).

An important advantage is that the authentication device 1 can be fabricated using equipment and technologies already available to printers, i.e. the same printers as are used for fabricating the documents or the packages that are to be protected. This makes the cost of fabricating an authentication device 1 of the invention marginal and enables the invention to be generalized, in particular for pharmaceuticals and other consumer goods, and also to very many documents that might be forged.

The Coded Entity

Figure 1:
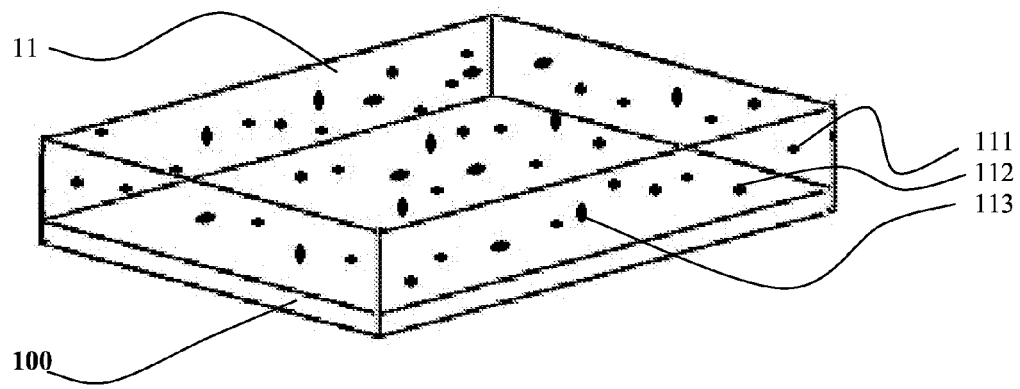
FIG. 1 shows a portion of an authentication device 1 of the authentication method of the invention, the device being constituted by a print medium 100 and a coded entity 11 forming a transparent layer in which disrupters 111, 112, et seq. are embedded.

Said disrupters may be protected by a layer of varnish or printed on the rear face of a transparent print medium. As shown in FIG. 1, it is also possible to incorporate disrupters 111, 112, et seq. in a block of transparent substance, e.g. a plastics card or a key ring.

A layer of varnish with an irregular reflective surface may be combined with disrupters placed randomly in a second layer of varnish placed under the first layer, in order to constitute a coded entity 11 that is very fine and very complex, and therefore very difficult to reproduce.

Said modules 1A, 1B, et seq., may be contiguous, where the notion of a "module" is determined at the time the description is established, however it is advantageous for the modules to be spaced apart from one another by surfaces referred to as "separation" surfaces that do not include any disrupters visible from said acquisition means 3. These separation surfaces advantageously present a combined surface area of at least 5% of the total surface area of the modules 1A, 1B, et seq. This makes it possible to have no doubts about which one of said modules any particular disrupter belongs.

It may be advantageous to print a grid defining boxes each defining one of said modules 1A, 1B, et seq. in order to mark said disrupters 111, 112, et seq. situated outside zones that are defined as constituting said modules.

The color of said separation surface is an important point. When the disrupters 111, 112, et seq. are bright, the color is advantageously dark, but when they are not bright it is desirable for said separation surfaces to pass light. A good solution is to make these surfaces translucent in order to mask the disrupters situated between two modules while providing good lighting of the disrupters being observed.

Said disrupters 111, 112, et seq., may be arranged in organized manner by the designer of the device. Some or all of them may also advantageously be distributed randomly. This procures two major advantages:

they can be very small, which prevents them from being reproduced; and they can be printed in large quantities with a print system that always performs the same print function, e.g. by mixing the disrupters in an ink that is translucent or transparent and always printing the same pattern with an offset plate.

In order to create an "original" description, it is possible to photograph the authentication device 1 on the fabrication line from a determined viewpoint, e.g. using a camera situated at said original viewpoint. This original viewpoint is determined relative only to the authentication device 1 and can therefore be found subsequently.

A description may also be made without taking a photograph when the arrangement of the disrupters is organized by the designer of the device.

An authentication device 1 of the invention may also have boxes of two types, firstly boxes that have the same appearance regardless of the position of the acquisition means 3 and regardless of the lighting, and secondly modules 1A, 1B, et seq. of the invention that return light in perceptibly different ways depending on the viewpoint from which they are observed.

Figure 7:
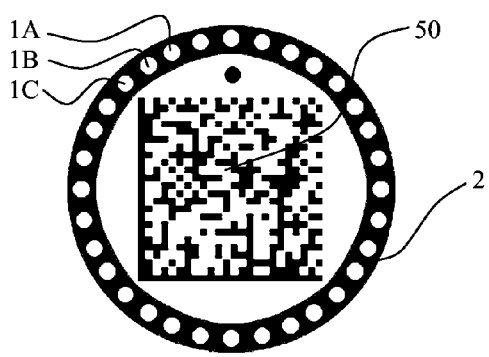
FIG. 7 shows a device of the invention made up of a prior art barcode 50 of the Datamatrix type associated with 32 modules 1A, 1B, 1C, et seq., organized as a circular ring. The device has a marker 2 in the form of a series of two concentric circles constituted by the two edges of circular ring.

FIG. 7 shows an example of such a mixed device. The center has a code 50 of the type known as a Datamatrix code, and the code is surrounded by a circular ring made up of modules 1A, 1B, et seq. that return light in perceptibly different ways depending on the viewpoint from which they are observed.

In a preferred embodiment, said disrupters 111, 112, et seq. present perceptibly different appearances depending on the direction of the light rays they receive, e.g. by reflecting or by polarizing or by filtering the light differently depending on the direction in which the light in question is received. This has the effect of causing the appearance of the authentication device 1 to depend on the position of the observer and also on the position of the light source.

Under such circumstances, it is necessary for the position of a light source to be the same for said original description and for said subsequent description so that the orientation of said disrupters observed while creating said subsequent description is indeed the same as that taken into account when creating said original description.

A light source used for establishing said subsequent description is advantageously the light projector of said acquisition means 3, e.g. a flash or a light-emitting diode (LED) of the camera or the smartphone. Some of said disrupters reflect light towards the acquisition means 3, while others do not.

It should be observed that using disrupters that reflect and/or transmit light in perceptibly different ways depending on the direction of the light rays they receive makes it possible to increase the number of descriptions that are possible for a given viewpoint, by varying the position of the light source(s) while retaining the same viewpoint.

Figure 4:
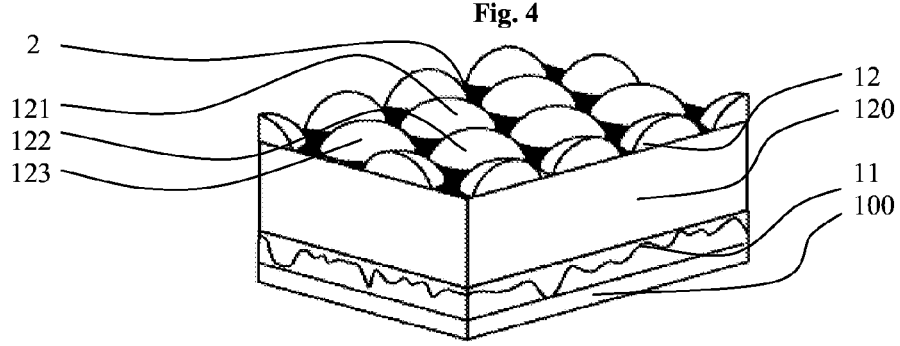
FIG. 4 shows an authentication device 1 of the authentication method of the invention constituted by a print medium 100, a coded entity 11 comprising a reflective ink layer of varying thickness constituting said disrupters 111, 112, et seq., and an optical magnifier device 12 constituted by a transparent film 120 and by lenses 121, 122, et seq.

In an embodiment of the invention shown in FIG. 4, said disrupters are portions of the surface of a layer of material that reflect and/or transmit light differently from the print medium 100 or from the preceding ink layer. By way of example, it may be a layer of ink or varnish applied on a print medium 100 and having surface tension that is so much less than the surface tension of the ink or varnish under consideration that said ink or varnish is repelled and forms irregular random spots on said print medium 100.

These irregular random spots may be of negligible thickness, however they could also be of sufficient thickness for the bodies of the spots and their edges to reflect light in different directions. It is also possible to use the variations in thickness of said layer to generate reflections in other directions.

Said disrupters may also be reflective chips such as for example flakes or metal or of plastics material coated in a reflective coating. They may also be elements that are transparent with a refractive index that is different from the index of the material in which they are embedded.

The advantage of using disrupters that are bright is that, even while spread over a plane surface so as to form a set of thickness that is very small or negligible, they nevertheless provide appearances that differ depending on the viewpoint from which they are observed, in a manner that would be done by a device that is three-dimensional and therefore much more bulky.

A second advantage is that the image that is captured is strongly contrasted and easy to analyze regardless of the environment, even when the disrupters are very small.

Said disrupters 111, 112, et seq., are advantageously invisible to the naked eye, i.e. they have a maximum dimension of less than 85 micrometers (μm) (which is equivalent to a resolution of 300 dots per inch (dpi), which is usually considered as being the limit of the resolving power of the human eye situated at the accommodation near point).

They are advantageously as small as possible so that a counterfeiter finds it difficult to reproduce a device of the invention, so small as to make it impossible with any known method to deliberately deposit a disrupter in a determined position (to copy disrupters that are arranged randomly).

In a preferred embodiment as shown in FIG. 1, said coded entity 11 is of thickness that enables said disrupters to be placed at different distances from the print medium 100, thereby considerably increasing the number of images of the authentication device 1 that can be seen from different viewpoints. To make counterfeiting more difficult, it is advantageous for said coded entity 11 to be of thickness that is greater than the thickness of the smallest disrupter used, because under such circumstances parallax differences appear between the views of the authentication device 1 taken from different viewpoints. Advantageously, said coded entity 11 is of a thickness that is not less than twice the greatest dimension of the smallest disrupter 111 used.

In another preferred embodiment, at least one of said disrupters 111, 112, et seq. includes a reflective plane that is not parallel to the main plane of said device. This makes the device more difficult to reproduce, since a set of disrupters situated in the same plane can be simulated by a printed reflective plate.

Some of the flakes 111, 112, et seq. advantageously have their main planes inclined relative to the main plane of the authentication device 1 so as to obtain a reflection from a viewpoint that is not situated vertically relative to the device when its main plane is horizontal. This makes it easier to acquire a device of the invention by acquisition means 3 having an objective lens close to the light source, since it is then possible to move the device away from any reflection of the light source in question on the main plane.

The light beam reflected by the flake 111 generally has a solid angle that is very small since the areas of the light source and of the flake are both very small. This can result in very great variability in the image of the device 1 as perceived by the acquisition means 3 for a very small movement thereof.

When said acquisition means 3 are held in the hand, it then becomes difficult to position it close enough to the original viewpoint.

It is therefore advantageous to provide the authentication device 1 with an optical diffuser. This has the effect of causing the light beam reflected by the disrupter 111 to leave said authentication device 1 with a solid angle that is greater than that of the beam entering said device and subsequently received by said disrupter. This optical diffuser may be a frosted surface situated on the front face of the authentication device 1, however it is also possible to embed the disrupters in a varnish that is not completely transparent but that is translucent, or in a varnish having particles that deflect light.

Another method of reducing the accuracy required in positioning said acquisition means 3 consists in using disrupters 111, 112, et seq. having surfaces that diffuse the light reflected, e.g. a frosted surface, or microstructures such as a reflection hologram. The person skilled in the art knows how to design holograms having at least one very small point that reflects white light in the form of a light beam of differing wavelengths and having a solid angle that is greater than that of the received beam. This very small point, constituting the disrupter, has a location that is very accurate relative to the disrupter containing the hologram, and it is therefore difficult or even impossible for a counterfeiter to position it deliberately.

Said disrupters 111, 112, et seq. may also be beads that are transparent or translucent. They are advantageously embedded in a layer of ink having low transparency and of thickness that is equal to or greater than their diameter. Such a bead is visible only via its portion that is tangential to the top surface of the ink or close thereto. This visible portion, which constitutes the disrupter, is also very small compared with the size of the bead in question and its location is therefore likewise difficult to determine deliberately. It may be possible for light to pass through a transparent or colored bead in certain directions only, depending on its position. The rear face of the coded entity 11 may be colored randomly and/or may be reflective.

In the above-described embodiment, the device of the invention is capable of operating equally well with lighting situated beside its front face or in transparency with lighting situated beside its rear face. The person skilled in the art can imagine numerous other structures having this capability.

Said disrupters 111, 112, et seq. may be obtained by printing an ink having surface tension that is greater than that of the print medium. This has the effect of the ink clumping randomly as drops that are very fine and tall.

A large difference in surface tension between the print medium and the ink has the drawback of the ink adhering poorly to the medium. To avoid that drawback, it is advantageous for said disrupters 111, 112, et seq. to be covered in a varnish that adheres to the print medium. This varnish serves to fasten them permanently.

One possible improvement consists in a material used in making said coded entity 11—such as for example the material used for some of said disrupters—to become visible under a particular kind of radiation, such as ultraviolet radiation, for example.

The person skilled in the art may also arrange materials having different refractive indices or that filter different colors or that polarize light in random manner between said disrupters and the outside face of the authentication device 1, in order to limit the reflection of light and/or in order to prevent a counterfeiter being able to understand the real optical configuration of said coded entity 11 or of any other element of said authentication device.

In order to make the system more complex and more difficult to counterfeit, said disrupters 111, 112, et seq. may be of shapes and/or colors that differ from one to another.

In an application to games and in particular to lotteries, the authentication device 1 may include means serving to ensure that all or part of said coded entity 11 cannot be seen clearly, with it being difficult for such means to be put back into their original state after they have allowed it to be seen clearly. One known solution consists in applying a layer of ink that is easy to remove by scratching. Under such circumstances, it is desirable for this scratchable ink layer to be kept separate from the coded entity 11 by a strong film. This can be done by printing the scratchable layer on the front face of the device and printing the coded entity on its rear face.

Figure 5:
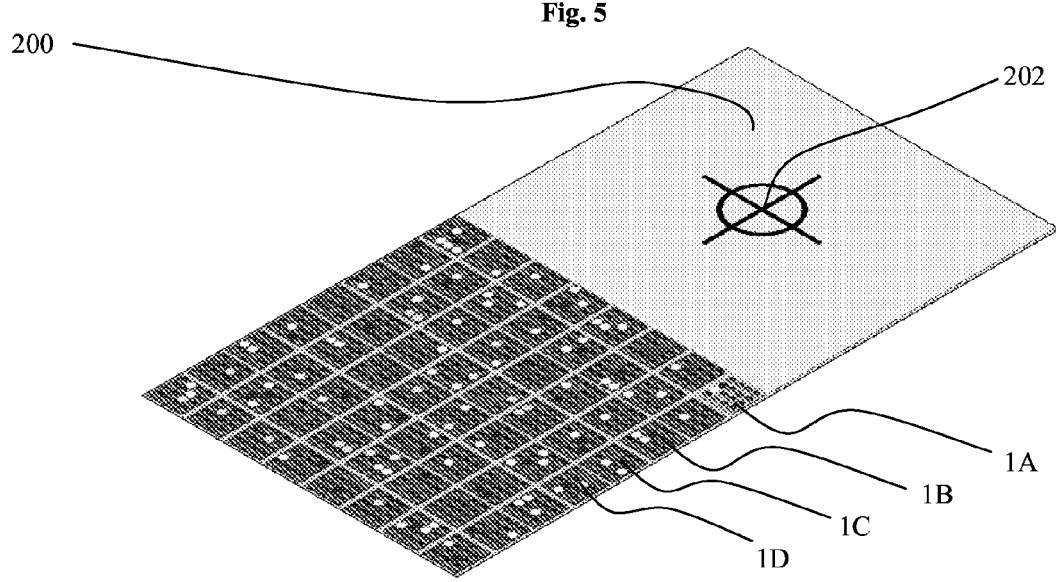
FIG. 5 shows an authentication device 1 having 64 modules 1A, 1B, et seq. organized as a checkerboard of eight rows by eight columns. The marker 2 is constituted by a reflective surface 200 provided with a target 202 in its center.

In a particular embodiment, the authentication device 1 is a label which is destroyed at least in part on being unstuck. Such a label is shown in FIG. 5. This embodiment serves to protect existing documents or goods, such as works of art, bottles of vintage wine, aviation or automotive spare parts, or official documents, for example.

In a preferred version, said disrupters 111, 112, et seq. are mixed with the adhesive of said label so that the way they are organized is disrupted during any attempt to unstick the label. Advantageously, the adhesive strength of the adhesive on the portion of the label that includes said marker 2 is less than its adhesive strength on the medium on which the label is stuck. Thus, during an attempt at unsticking, said disrupters are separated from the portion of the label that includes said marker 2.

(Optional) Optical Device 12

The authentication device 1 of the invention is advantageously associated with an optical device 12 made up of a plurality of individual optical devices 121, 122, et seq.

Such an individual optical device 121 may be a converging lens. This makes it possible to magnify the disrupters 111, 112, et seq. optically.

By way of example, an individual optical device 121 is a convex lens that may be spherical or cylindrical and that is focused on a plane that is close to or included in said coded entity 11.

The magnifying optical device 12 may be a device of the kind known as a lens array, however it is used differently in the invention: instead of being used to produce a particular visual effect such as animation, representing a photograph three-dimensionally, or moire magnification, or indeed to make it difficult to understand how the coded entity 11 is organized, it is used mainly to enable some of said disrupters 111, 112, et seq. to be seen from a distance. Lens array devices are known for use in the context of security devices, e.g. from U.S. Pat. No. 4,417,784 (Knop & Gale 1983 Nov. 29) which explains that by combining a coded image with a lens array, it is difficult for the coded image to be understood and thus to be reproduced. That principle has been taken up in numerous documents including U.S. Pat. No. 5,543,965 (A) (Bielinski & Herber 1996 Jul. 6), which describes an auto-stereoscopic lens display having an image generated by creating a plurality of random points. Those prior art devices have the drawback of being easy to reproduce for the person skilled in the art having appropriate equipment.

The first advantage of such a device is to make it possible to see disrupters that are smaller and therefore that are organized in a manner that is correspondingly more difficult to reproduce. The second advantage is that the coded entity 11 may be of thickness that is very small or negligible, even though the authentication device 1 presents appearances that are very different depending on the viewpoint from which the disrupters are observed, as would occur in a three-dimensional device that is much less compact.

The converging optical devices 121, 122, et seq. have a focal plane situated in the immediate proximity of said coded entity 11, and each of them has the effect of optically magnifying said disrupters situated in the alignment of the objective lens of the optical acquisition means 3 and of the optical center of the lens under consideration, while ignoring said neighboring disrupters. The decoder may thus be smaller in size while providing an image of the same resolution that is easy to photograph with an ordinary camera.

An authentication device 1 may be constituted by a transparent print medium 100, said magnifying optical device 12 being printed on one face of said print medium 100 and said coded entity 11 on the other face of said print medium 100.

It may also be constituted by a coded entity 11 printed on a print medium 100 and by a magnifying optical device 12 fitted onto said coded entity 11. The magnifying optical device 12 may be constituted by a transparent film having lenses on one of its faces, said film being adhesively bonded via its other face onto said coded entity 11. Said transparent film may also be constituted by a thickness of varnish covered in lenses 121, 122, et seq. so that the distance between the focus of a lens and a disrupter element is sufficient.

The distance between the focus of a converging optical device and a disturber is advantageously less than the focal length of the converging optical device in question, but it may also be substantially equal to said focal length or greater. The important point is for the optical device to magnify the appearance of the disrupter element.

The converging optical devices 121, 122, et seq. may be contiguous or they may be spaced apart from one another, they may be arranged regularly or otherwise, they may be distributed randomly, and they may all have the same focal length or they may have focal lengths that differ from one another, thus making it even more difficult to copy an authentication device 1 of the invention.

An individual converging optical device 121 may also be concave mirror situated behind the coded entity 11. This embodiment (not shown) has the advantage of making it possible to make authentication devices that are finer than those that make use of convex lenses.

An individual optical device 121 may also be a diverging device. This makes it possible to reduce the sensitivity of the device to variations in the position of said acquisition means 3.

In a particularly recommended embodiment, a module 1A has only one individual optical device 121. This enables the module to have a location that is well-determined and unchanging, and that is easy to identify in three dimensions when analyzing the acquisition performed by said acquisition means 3, while also ensuring a strong difference between the appearances of the various modules from a given viewpoint.

Creating Said Original Description

The term "description" is used herein to mean any type of computer file made from an acquisition performed either by computer simulation or by any optical acquisition means 3, such as a camera, a scanner, a barcode reader, etc. . . . . For example it may be a photograph of the device seen from said original viewpoint.

A device of the invention may have the appearance of a 2D barcode such as those known under the names Datamatrix or Maxicode or indeed QR code, with the exception that it provides information that differs depending on the position of the observer.

Numerous different methods may be used for describing a module 1A, such as, for example: the maximum or minimum or mean brightness in one or more colors of the pixels that make it up. The use of minimum or maximum values makes it possible to rule out surfaces that do not include any disrupter that is visible from said acquisition means 3 and that are situated outside the zone of a module that is deemed to be significant, and to give values that are very different to modules each having a plurality of disrupters.

Another way of writing a description consists in noting the brightness of modules of the coded entity 11 having one or more characteristics in common, e.g. by noting the coordinates of the modules that are brightest at an agreed wavelength.

An "original" description may be recorded in said database on fabrication of the authentication device 1, however it may also be created after said authentication device 1 has been put into service.

This task may thus be given to the user of the device. The acquisition means 3 for use subsequently in obtaining the subsequent description will then have exactly the same optical characteristics as the device that was used to make the original description, since it is the same device that is used for both operations. This constitutes an additional advantage.

In the most usual situation, an original description of the authentication device 1 is conserved in a database.

It is also possible for a plurality of original descriptions of the authentication device 1 corresponding to different viewpoints or to different lighting to be conserved in said database. This has the effect of increasing the number of possible combinations. In order to make fraud more difficult, this requires a plurality of comparisons to be made with a plurality of original descriptions from viewpoints or with lighting characteristics that differ from one comparison to the next.

Said database may be conserved in the memory of a computer controlling said acquisition means 3, however it is also possible for said "original" description to be conserved in a server computer capable of communicating with said acquisition means 3, and possibly also conserving a secret suitable for use in the authentication procedure.

Under such circumstances, it must be ensured that communication between said acquisition means 3 and said remote computer server is secure.

Once said original description has been established, said authentication device 1 may be marked with an "additional identification" element established on the basis of the original description. This additional identification element may comprise all or part of said original description.

It is possible for two authentication devices of the invention, and in particular for devices including disrupters 111, 112, et seq. that are distributed randomly, to be found to be completely identical after fabrication in the sense that they generate the same original description. They can then advantageously be distinguished by such marking.

With certain very accurate devices, a small movement of said acquisition means 3 may lead to an undesired modification of the "subsequent" description. To avoid that, it is advantageous for said original description of the authentication device 1 to be calculated while taking account of multiple acquisitions of said authentication device 1, corresponding to different viewpoints and to different lighting. By performing a plurality of acquisitions from viewpoints close to said original viewpoint, it is possible to distinguish between portions of the device 1 that are subject to such undesired variations, and other portions that may be considered as presenting values that are modified little by a small movement of said acquisition means 3, where such portions are referred to below as "reliable portions".

An original description derived from these "reliable portions" may thus take the form of a number. The procedure for distinguishing between authentication devices of the invention for which mere acquisition of the random cells would lead to the same original description—as explained above—makes it possible for this number to be made unique. It can then be used as the unique identifier of the authentication device 1, and thus of the goods or documents with which it is associated.

Advantageously, a description may comprise the definition of these "reliable" portions, and their scores. By ignoring the other portions of the device, a description is obtained that does not depend on precise positioning of said acquisition means 3 during a "subsequent" acquisition.

The comparison between said subsequent description and said original description then relates only to said disrupters for which said brightness scores obtained during said two acquisitions have values that differ by an amount that is less than some freely predetermined threshold. The optimum threshold, i.e. the threshold that corresponds to the accuracy of said means for positioning the acquisition means 3, may be freely determined by the person skilled in the art.

Taking a plurality of acquisitions from viewpoints close to said original viewpoints can be made easier if said acquisition means 3 is provided with a said image multiplier 6 that provides a plurality of images of said authentication device 1. Such an image multiplier optical device 6 is shown in FIG. 8. It comprises four plane prisms 61, 62, 63, and 64. When placed between the acquisition means 3 and the authentication device 1, as shown in FIG. 13, it provides four images of said authentication device, corresponding to different viewpoints.

When said disrupters 111, 112, et seq. present perceptibly different appearances depending on the direction of the light rays they receive, each of the prisms may be masked when taking an image, e.g. using a liquid crystal device, so that the light source used does not pass through the prisms that do not correspond to the viewpoints being acquired. Four acquisitions are then taken in succession.

The person skilled in the art knows how to juxtapose other numbers of prisms so as to make acquisitions from some other number of different viewpoints, e.g. nine or sixteen by juxtaposing nine or sixteen prisms.

The Authentication Procedure

The two acquisitions of said device 1 in the authentication procedure may be performed in succession with said acquisition means 3 or simultaneously with a plurality of acquisition means.

The comparison between the two acquisitions, one taken with ambient lighting only and the other with additional lighting, enables the person skilled in the art to deduce therefrom a difference suitable for calculating a description from which the effect of ambient lighting is eliminated.

For an authentication device 1 of the invention that has an "additional identification" element, the authentication procedure need not require access to a telecommunications network: said subsequent description is compared at least in part with all or part of said additional identification element established from said original description. In order to prevent a counterfeiter fabricating devices of the invention, it is recommended to encrypt said identification element in asymmetric manner: a private key for use in performing such coding is not made available to the public, while a public key that allows the application to decrypt the element is made available to the public or only to people authorized to perform authentication operations.

Positioning

Determining the three-dimensional position in which said acquisition means 3 are located relative to said authentication device 1 is an essential step in the acquisition procedure using said acquisition means 3.

The position may be determined by instructions given to the operator, or by using a template on which the acquisition means 3 must be placed, as shown in FIGS. 13 and 14. Under such circumstances, a plurality of acquisition means and a plurality of light sources may be available in order to avoid any need to use mechanical means during the acquisition procedure (versions not shown).

In a preferred version, the acquisition procedure nevertheless begins with a step of three-dimensional positioning that is computer-assisted.

The telemeter forming part of said acquisition means 3 makes it possible to determine the distance between the acquisition means 3 and the authentication device 1, however it is simpler to measure the apparent size of the device, which increases as said acquisition means 3 come close to said authentication device 1.

Said determination of the position in which said acquisition means 3 are located relative to said authentication device 1 may include measuring deformation due to the perspective of the image as perceived by said acquisition means 3 and affecting some or all of said authentication device 1, and/or of the goods or the document carrying the authentication device 1. It is thus possible to calculate the three-dimensional position of the acquisition means 3 relative to said authentication device 1. A computer connected to said acquisition means 3 can perform calculation to deduce the direction of the movement to be applied to said acquisition means 3 in order to bring it closer to said additional viewpoint. When the acquisition means 3 comprise a camera, the movement to be applied thereto is specified by a visual indication on the screen, and the camera can acquire images during the procedure while finally conserving only the desired acquisition(s).

In order to evaluate the position of said acquisition means 3 with the best possible accuracy, it is recommended to analyze the deformation due to the perspective of the image of the largest possible component of the protected document or goods, e.g. its outline if it is constituted by a label. During fabrication, it is also possible to place markers on the protected document or goods for use in this analysis of the deformation of the image due to perspective.

Figure 2:
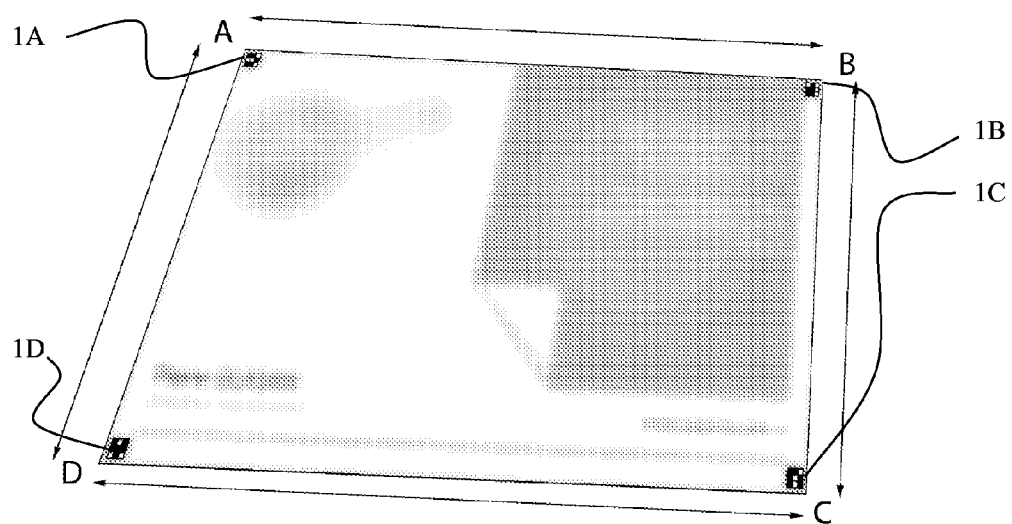
FIG. 2 shows a business card protected by an authentication device 1 of the invention having four modules 1A, 1B, 1C, and 1D situated in the proximity of the four corners A, B, C, and D of the card, the configurations of these four modules constituting a recognizable graphics structure referred to as a "marker" 2.
Figure 3:
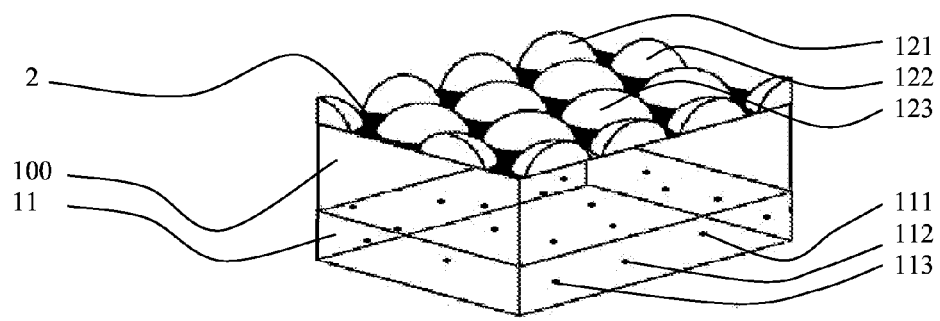
FIG. 3 shows an authentication device 1 of the authentication method of the invention, constituted by a transparent print medium 100, a coded entity 11 forming a transparent layer in which disrupters 111, 112, et seq. are embedded, and an optional magnifying optical device 12 constituted by lenses 121, 122, et seq. In this embodiment the marker 2 is constituted by the black surface between the lenses.

As shown in FIG. 2, the identification device 1 may also be shared between a plurality of modules 1A, 1B, et seq. situated at various spaced-apart locations, and the image perceived of these locations may be used as a marker for evaluating the position of said acquisition means 3.

A marker 2 is advantageously constituted by one or more circles such as those shown in FIG. 7, which are easy to detect, and known methods are available for easily analyzing their deformation due to perspective. Numerous 3D vision methods exist that enable primitives to be detected by homographic transformation. The standardized direct linear transform (DLT) algorithm is one of the best known of these methods and it solves a set of variables of a set of similarity relationships. It eliminates the need to make initial approximations, as are required for non-linear solutions.

One of the known methods is described in EP 1 143 372 B1. It is a procedure for reading a two-dimensional barcode symbol having orientation modules and a search pattern with a central point, the method including in particular executing a step of searching for data modules in order to calculate position and shape information for all of the modules making up the barcode symbol, which can be omitted in the context of the present invention, while retaining only the scanning of the positioning outline and determining its central point within the scanned image.

Another method of determining the position in which said acquisition means 3 are located relative to said authentication device 1 consists in providing the authentication device with a marker 2 constituted by a reflective surface 200 having a target 202.

The reflective surface 200 may be incorporated in the device, or it may be separate, being removable and being placed thereon when making an acquisition. The first advantage of a removable reflective surface 200 is to simplify the structure of the device, since the reflective surface 200 is then a transparent plastics sheath or a glass plate. The second advantage is that it is possible to use a large reflective area 200 even though the protected goods are very small, e.g. a unit package for a pharmaceutical.

Said determination of the position in which said acquisition means 3 are located relative to said authentication device 1 advantageously includes detecting a reflection on said reflective surface 200 of a characteristic element of said acquisition means 3 or of a light source secured to said acquisition means 3.

Said original viewpoint is then advantageously defined relative to said authentication device 1 as being situated on the straight line representing the reflection on said reflective surface 200 of a light ray coming from said characteristic element 201 and passing via said target 202.

In order to place said acquisition means 3 at said original viewpoint, the user need only move the acquisition means until the characteristic element 201 can be seen at an agreed location of said reflective surface 200, e.g. a target 202.

When said characteristic element 201 is said light source, said reflective surface 200 may present very poor reflective quality, e.g. such as that of ordinary coated paper, since that is sufficient to enable the user to identify the position of the reflection of said light source on said reflective surface 200. Advantageously, said reflective surface 200 is nevertheless a surface covered in a bright varnish.

Figure 6:
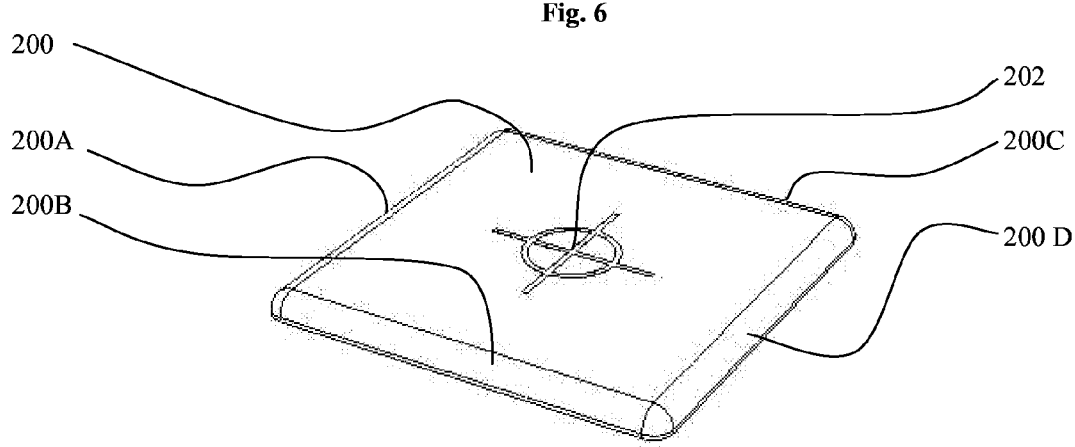
FIG. 6 shows the reflective surface 200 of an authentication device 1 with edges 200A, 200B, et seq. that are reflective and rounded.

Under numerous circumstances, said reflective surface 200 needs to be very small in order to avoid taking up too much space on the goods or document for protection. An improvement of the present invention consists in providing it with reflective curved surfaces 200A, 200B, et seq., e.g. constituted by the edges of said surface as shown in FIG. 6. The reflection of the light source on said rounded edges gives the position of the light source even when it is remote from the desired position, since the reflection is on a surface facing sideways when the light source is far away in the direction corresponding to that side.

The position of the reflection of said light source can be analyzed by a computer so that the user receives simple instructions concerning the direction in which said acquisition means 3 should be moved so as to be placed at said original viewpoint.

Whatever the method used for determining the position in which said acquisition means 3 are located relative to said authentication device 1, it is advantageous to assist the user in placing said acquisition means 3 in the position corresponding to said original viewpoint. The search for the most ergonomic solution leads to said acquisition means 3 having a screen, with the screen displaying a stationary graphic and a virtual graphic indicating the position of said original viewpoint, thereby informing the user about the direction in which said acquisition means 3 should be moved in order to be placed in the location corresponding to said original viewpoint. The virtual graphic is calculated by computer, and may be displayed in such a manner as to coincide with said stationary graphic when said acquisition means 3 are in the location corresponding to said original viewpoint.

Acquiring the Code

In order to limit acquisition errors, it is particularly advantageous for the creation of a description to consist, for each module, in analyzing an area that is greater than the area of the module under consideration, said area extending from the module over a zone that does not include any disrupters visible from said acquisition means 3. It is therefore more probable that each module will indeed be taken into account in full.

FIGS. 9 to 12 show an organization of the authentication device 1 of the invention that makes it possible to limit variation in the image of the device as perceived by said acquisition means 3 for very small movements of the acquisition means, when the authentication device 1 includes an optical device 2 itself made up of a plurality of individual converging optical devices 121, 122, et seq. With this organization, an individual converging optical device 121 focuses on a "focus" surface 1212 that includes a "significant" zone 1213 including disrupters, and said significant zone is smaller than said focus surface and is surrounded by a zone that does not include any disrupters. Thus, when said acquisition means 3 are moved a little, all of the disrupters taken into account in said original description remain visible through the individual converging device under consideration without any other disrupters becoming visible.

The stage of causing said acquisition means 3 to approach said original viewpoint is a good occasion for performing additional acquisitions. A description may thus be created and stored during a stage in which said acquisition means 3 are approaching said original viewpoint.

Multiple descriptions may also be established by the user. Pairs [description a, position a], [description b, position b] et seq. are then advantageously created and stored throughout the stage in which said acquisition means 3 are approaching said original viewpoint.

Telecommunications Security

It is particularly advantageous for only a portion of said subsequent description to be transmitted to said computer server for comparison purposes. The definition of which part to transmit may be different for each authentication operation, and may even be performed randomly.

In a preferred version, a secret is provided by said computer server. The authentication procedure then cannot be performed without connecting to the server. In a preferred version, the secret is provided in real time by said computer server. Said secret may comprise an algorithm defining the way in which all or part of said subsequent description is to be calculated and transmitted to said computer server. The definition of which portion of said subsequent description is to be transmitted to said computer server may be defined by said algorithm, which may be different from the algorithm used for a preceding transmission of said subsequent description. It may also include an encryption key.

It is particularly recommended not to provide pirates with the definition of the transmitted portion and to encrypt this information using a key that is provided in real time by said computer server.

A preferred solution consists in the secret comprising a code for single use. The secret may be encrypted by a key constituted in full or in part by a number calculated from said subsequent description, which may be known to said computer server.

In order to increase the security of authentication operations, it is advantageous for the secret to include a random number that is transmitted by said computer server at the end of an operation of comparing a "subsequent" description with an "original" description, and for this random number to be requested by said server in order to authorize the following comparison operation.

This method is recommended when a secret code of the invention is used for creating a card to authenticate a person, e.g. in order to enable that person to access functions personal to that person on an Internet site. A pirate might have read the description of the code of the invention as present on the card and then might simulate sending a portion of the code with counterfeit software. The need to send a random number received during the preceding operation makes it necessary simultaneously to steal the computer or the mobile telephone of the bearer of the card. Other known methods make it possible for the server to verify the integrity of the software hosted by said acquisition means 3.

Advanced Procedures

In some circumstances, the acquisition procedure using said acquisition means 3 is advantageously launched by a command that includes, directly or indirectly, the address of a client seeking to obtain a result of comparing said subsequent description with said "original" description of said authentication device 1. By way of example, the client may be a bank seeking to certify the postal address of the holder of an electricity bill including a code of the invention. This holder is referred to below as the "billee". The code may include the postal address of said billee, or a code making it possible to obtain it from a server of the issuer of the electricity supplier. Either way, said command requests the billee to give permission to the electricity supplier to forward his or her personal address to said bank, and the operation includes providing said bank with a link making it possible to obtain the address. This link is advantageously associated with a single-use password that is valid for a limited duration.

The acquisition procedure with said acquisition means 3 is advantageously launched by a command contained in a file opened by the computer application managing said acquisition procedure. The file may be received by email, or it may be obtained by clicking on a link. It suffices for the nature of the file to be associated with the application for authenticating a code of the invention to enable the operation to be made automatic and very simple to perform for the user.

Said command may be launched by reading a barcode. The barcode may contain the address of a client seeking to obtain a result of the comparison of said subsequent description with said "original" description of said authentication device 1, or the Internet address at which said address can be found.

Said barcode may be displayed on the screen of another computer. This enables a second computer to read it by acquiring the code with its camera. This constitutes practical means for transferring information from a computer to a mobile telephone, for example.

An improvement in the method consists, after the comparison of said subsequent description with said "original" description of said authentication device 1, for said computer server to send an Internet link making it possible to recover information relating to the results of the comparison.

To return to the above-mentioned example of a bank and an electricity bill, the electricity supplier does not send the address of the holder but rather sends a link making it possible to recover that address.

Communication of the link may be accompanied by providing a cryptographic key making it possible to decrypt the transferred data. This prevents the data being captured by a pirate while it is being transferred.

This method of selectively extracting data provides considerable novelty in the transfer of data from server to server, since it makes it possible physically to limit data communication to no more than the legitimate needs of the beneficiary, as defined by law and as selected by the person to whom the data relates.

This method is also monitored and made secure since it requires an agreement of the person concerned by the data and it is secure: it requires a personal document to be presented such as a card or a bill including the code of the invention, which cannot be reproduced, and it requires the data to be encrypted while it is being transferred over telecommunications networks.

Said database may be updated either before codes of the invention are put into service, or later. If updated later, an important task is transferred to the client instead of being performed by the supplier of the service.

Nevertheless, care must be taken to ensure that it is not possible for someone to pass themselves off as someone else and give a fraudulent value to codes of the invention.

The method used is as follows:
  an authentication device 1 is associated in said database with a person referred to below as the "user";
  it is given to said user by known means making it possible to be sure of the identity of said user, such as for example sending by registered mail to the personal address of said user; and
  said user subsequently updates said database with information relating to the article fitted with said authentication device 1.

Methods of Fabricating the Authentication Device 1

It is possible to fabricate a device of the invention by very many known printing methods, using an ink having two immiscible materials, e.g. solid disrupters 111, 112, et seq. embedded in a transparent ink that becomes solid after polymerizing or drying. This method is compatible with practically all printing techniques using liquid or powder ink.

It is also possible to use an ink-jet printer to spray the transparent ink and the disrupters, or to spray ink to different colors, some of which act as disrupters.

It is also possible to print a pattern with the reputation of being difficult to print, e.g. having zones for printing or not printing that are too small, thereby having the effect that the capillarity of the ink causes it to clump together in the form of random zones.

Another method consists in printing a pattern on a medium that has surface tension that is very low compared with that of the ink being used. The ink being repelled by the medium causes the ink to move in application of rules that are very complex and difficult to predict and thus to reproduce.

The methods described above have the major advantage of being printing methods that can be the same as the methods that are used for fabricating the goods to be protected by the authentication system of the invention.

Said optional magnifying optical device 12 may be obtained either by laminating a film including one or more converging lenses, e.g. embossed therein, or more advantageously by printing lenses by applying a varnish constituting lenses directly on said coded entity 11 or on an intermediate layer of varnish, or on a film fitted thereon.

Three main fabrication techniques are proposed, leading to different structures for a device of the invention.
  It is possible to print the disrupters 111, 112, et seq. directly on the document or goods to be protected, and optionally to cover the set with a layer of varnish that optionally includes converging optical devices.
  It is possible to print the disrupters 111, 112, et seq. on a sheet of paper that is very fine and fragile, that is itself stuck with strong adhesive onto a silicone-coated medium, and optionally to cover the set in a layer of varnish optionally including converging optical devices. The device can easily be unstuck from the silicone-coated medium in order to be put into service on goods or a document to be protected, however thereafter any attempt at unsticking the device inevitably leads to the sheet of paper being torn and thus to the destruction of the coded entity 11.

It is possible to print the disrupters 111, 112, et seq. on the rear face of a transparent sheet that optionally includes converging optical devices on its front face. The transparent sheet is then stuck via its rear face on a silicone-coated medium using strong adhesive that may advantageously be the transparent element containing said disrupters. The coded entity 11 is unchanged when the device is unstuck from the silicone-coated medium, but thereafter any attempt at unsticking it inevitably leads to the coded entity 11 being destroyed.

The converging optical devices 121, 122, et seq. of said optional magnifying optical device 12 may be made using any means, such as for example printing a transparent ink, using known techniques such as those described in the following documents: WO 2009/147353 (Guigan et al., 2009 Dec. 10); PCT/FR2011/000315 (P. Guigan 2010 Jun. 30); U.S. Pat. No. 6,833,960 (J. S. Scarbrough 2004 Dec. 21); U.S. Pat. No. 6,856,462 (J. S. Scarbrough 2005 Feb. 15); and U.S. Pat. No. 7,609,451 (J. S. Scarbrough 2009 Oct. 27). Under such circumstances, the converging optical devices 121, 122, et seq. are printed structures, and the entire authentication device 1 can be made by a conventional printing method, which may be that used for printing the goods or the document that is to be protected from counterfeiting or fraud, thereby considerably reducing the cost of the authentication device 1 so that this cost becomes substantially negligible.

Applications

Applications go well beyond those of the existing marketing for security devices:

health: pharmaceuticals, prescriptions, certificates, etc.;

protecting trademarks: labels, cases for goods, authentication seals, boxes, cartons, flexible sachets, capsules, bags, blister packs, bottles, pots, cabinets, etc.;

payment: bank notes, checks, credit cards, coupons, etc.;

ticket: travel tickets, entertainment tickets;

official documents: driver licenses, residence permits, log books, insurance certificates, social security cards, identity cards, passports, voter cards, postal stamps, diplomas, member or loyalty cards, tickets for transport or entertainment, prescriptions, certificates of origin, etc.;

economic activity: business paperwork, headed notepaper, deeds and contracts, receipts, vouchers, bank statements, securities, bills, pay slips, judgments, orders, certificates, etc.;

printing media: security paper for office printers or ready for printing by professional printers, etc.;

any goods on which it is possible to print: jewelry, watches, spare parts and supplies, consumer electronics, components and consumables, data media (CDs, DVDs, etc.), labels for clothing and other fashion articles, local crafts, etc.;

labels ready for sticking on any article (works of art, pieces of furniture, wines, jewelry, etc.);

various: games and lotteries, traceability, logistics, etc.; and goods belonging to some particular world (organic food, fairtrade, food prepared in compliance with the rules of such and such a religion, etc.).

Having recourse to a central server may be essential for authenticating the origin of goods or a document, and this can make it possible to establish statistical information concerning the destinations of goods and documents and even, by comparing a plurality of authentication operations performed by a given user, making it possible to have a better understanding of the behavior of consumers.

One of the major fields of application of the invention lies in secure identification of people, in particular on the Internet: on-line payment, authentication of emails and contracts, secure transfer of data and funds, secure access to intranets and to personal pages, communicating encryption keys, and more generally obtaining rights on all kinds of site, in particular bank sites, social sites, game sites, etc.

The invention claimed is:

1. An authentication method which establishes a subsequent description of an authentication device that comprises a coded entity provided with light-disrupting elements referred to as "disrupters", and which compares this description with an original description of said authentication device, wherein the method comprises:

said disrupters are grouped together in sub-entities referred to as "modules", with a module returning light in perceptibly different ways depending on the point of view from which it said module is observed;

a description includes an operation referred to below as "acquisition" that uses acquisition means for measuring the brightness of a plurality of said modules, at one or more wavelengths or sets of wavelengths;

said original description is established from an acquisition made from an original viewpoint defined relative to said authentication device; and the procedure enabling said subsequent description to be established and enabling said comparison to be made comprises:

using positioning means that co-operate with a recognizable graphics structure referred to as a "marker" to determine the three-dimensional position in which said acquisition means are located relative to said authentication device;

taking an acquisition while said acquisition means are placed close to the original viewpoint; and taking at least one additional acquisition:

either from a viewpoint that is perceptibly different from said original viewpoint;

or else under lighting that is different from that used for the acquisition that was used for establishing said original description.

2. The authentication method according to claim 1, wherein an original description of the authentication device is stored in a database and a plurality of original descriptions of the authentication device corresponding to different viewpoints or to different lighting are stored in said database.

3. The authentication method according to claim 1, wherein establishing said original description is followed by marking said authentication device with an additional identification element that is established from the original description and wherein when it is found that two devices have the same original description corresponding to the same viewpoint, they are distinguished by such marking.

4. The authentication method according to claim 1, wherein said original description of the authentication device is calculated while taking account of at least two acquisitions of said authentication device that correspond to two different viewpoints or to two different lighting conditions.

5. The authentication method according to claim 1, wherein said subsequent description is established by comparing two acquisitions of said device taken by said acquisition means, one using ambient lighting on its own and the other using additional lighting.

6. The authentication method according to claim 1, wherein the screen of said acquisition means displays a stationary graphic and a virtual graphic giving the position of said original viewpoint.

7. The authentication method according to claim 1, wherein a description is created and stored during a stage of approaching said acquisition means to said original viewpoint.

8. The authentication method according to claim 1, wherein there exists a computer server capable of communicating with said acquisition means and having stored therein said original description and/or a secret useful in the authentication procedure and wherein a secret is provided by said computer server.

9. The authentication method according to claim 8, wherein the secret comprises a random number transmitted by said computer server at the end of an operation of comparing a subsequent description with an original description, and wherein the random number is requested by said server in order to authorize the following comparison operation.

10. The authentication method according to claim 1, wherein the grouping together of said disrupters in sub-entities referred to as "modules" is made at the time of the step of establishing a description.

11. An authentication device comprising:
a coded entity provided with light-disrupting elements referred to as "disrupters" grouped together in sub-entities referred to as "modules", with a module returning light in perceptibly different ways depending on the viewpoint from which said module is observed; and
a recognizable graphics structure referred to as a "marker" enabling a positioning means to determine a position in which the authentication device is to be found relative to an acquisition means, wherein said authentication device is suitable for performing an authentication method establishing a subsequent description and comparing the subsequent description to an original description of said authentication device, wherein
said description includes an operation referred to below as "acquisition" that uses said acquisition means for measuring the brightness of a plurality of said modules, at one or more wavelengths or sets of wavelengths;
said original description is established from an acquisition made from an original viewpoint defined relative to said authentication device; and
the procedure enabling said subsequent description to be established and enabling said comparison to be made comprises:
using positioning means that co-operate with a recognizable graphics structure referred to as a "marker" to determine the three-dimensional position in which said acquisition means are located relative to said authentication device;
taking an acquisition while said acquisition means are placed close to the original viewpoint; and
taking at least one additional acquisition:
either from a viewpoint that is perceptibly different from said original viewpoint;
or else under lighting that is different from that used for the acquisition that was used for establishing said original description.

12. The authentication device according to claim 11, wherein said modules are separated from one another by separation surfaces that do not include any disrupters visible from said acquisition means, and wherein said separation surfaces presenting a combined area that is not less than 5% of the total area of the modules.

13. The authentication device according to claim 12, wherein creating a description consists, for each module, in analyzing an area greater than the area of the module under consideration, said area projecting beyond said module over a zone that does not include disrupters.

14. The authentication device according to claim 11, wherein all or some of said disrupters are distributed randomly.

15. The authentication device according to claim 11, comprising two types of box, firstly boxes having the same appearance regardless of the position of the acquisition means and regardless of the lighting, and secondly boxes that are modules of the invention.

16. The authentication device according to claim 11, wherein said disrupters present appearances that are perceptibly different depending on the direction of the light rays they receive.

17. The authentication device according to claim 16, wherein at least one of said disrupters includes a reflective plane that is not parallel with the main plane of said device.

18. The authentication device according to claim 11, further including an optical diffuser.

19. The authentication device according to claim 11, comprising means making it possible to prevent some or all of said coded entity being seen clearly, which means are not capable of being returned to an original state easily after being taken out of service.

20. The authentication device according to claim 11, wherein it is a label that is destroyed at least in part on being unstuck.

21. The authentication device according to claim 20, wherein said disrupters are mixed with the adhesive of said label.

* * * * *